(12) United States Patent
Funnell (10) Patent No.: US 9,866,844 B2
(45) Date of Patent: Jan. 9, 2018

(54) METHOD, SYSTEM AND DEVICE FOR IMAGE AND VIDEO CODING

(71) Applicant: Parabola Research Limited, Southampton (GB)

(72) Inventor: John Stuart Funnell, Southampton (GB)

(73) Assignee: Parabola Research Limited, Southampton (GB)

(*) Notice: Subject to any disclaimer, the term of this patent is extended or adjusted under 35 U.S.C. 154(b) by 88 days.

(21) Appl. No.: 15/148,748

(22) Filed: May 6, 2016

(65) Prior Publication Data

US 2016/0353116 A1    Dec. 1, 2016

Related U.S. Application Data

(60) Provisional application No. 62/167,727, filed on May 28, 2015.

(30) Foreign Application Priority Data

Apr. 27, 2016   (EP) ..................................... 16167220

(51) Int. Cl.
*H04N 7/50*         (2006.01)
*H04N 19/167*       (2014.01)
(Continued)

(52) U.S. Cl.
CPC ....... *H04N 19/167* (2014.11); *G06F 12/0223* (2013.01); *G06T 1/60* (2013.01);
(Continued)

(58) Field of Classification Search
USPC ....................................................... 382/238
See application file for complete search history.

(56) References Cited

U.S. PATENT DOCUMENTS 6,519,287  B1    2/2003   Hawkins et al.
2006/0222080  A1   10/2006   Wang
(Continued)

OTHER PUBLICATIONS

European Patent Office, EPO Application No. 16167220.9, "European Search Report", dated Sep. 29, 2016, 2 pages.
(Continued)

*Primary Examiner* — Jerome Grant, II
(74) *Attorney, Agent, or Firm* — Kang S. Lim (57) ABSTRACT

The present invention relates to a method of image processing or coding comprising dividing image data into a plurality of blocks of image data wherein each block is defined by a first positional index and a second positional index. For each block of image data, firstly the block of image data is processed at step 402 to generate at least one parameter value required to process one or more adjacent blocks of image data, secondly a position of a memory element in a parameter memory is determined by combining the first positional index of the block of image data with the second positional index of the block of image data, and thirdly the generated at least one parameter value is stored at step 406 in a memory element in the position by overwriting at least one parameter value generated from a previously processed block of image data which has been previously stored at the determined position in the parameter memory. The method enables at least one parameter value for an image section image section to be generated and stored in a position which is occupied by a previously generated parameter value. All of the parameter values are stored in a simple one-dimensional array which is computationally efficient to access.

16 Claims, 8 Drawing Sheets

(51) Int. Cl.
  *G06T 1/60* (2006.01)
  *H04N 19/176* (2014.01)
  *H04N 19/593* (2014.01)
  *H04N 19/423* (2014.01)
  *H04N 19/119* (2014.01)
  *G06F 12/02* (2006.01)

(52) U.S. Cl.
  CPC ......... *H04N 19/119* (2014.11); *H04N 19/176* (2014.11); *H04N 19/423* (2014.11); *H04N 19/593* (2014.11); *G06F 12/0207* (2013.01)

(56) References Cited

U.S. PATENT DOCUMENTS

| | | |
|---|---|---|
| 2006/0291566 A1 | 12/2006 | Mehta et al. |
| 2008/0043842 A1 | 2/2008 | Nakaishi |
| 2012/0328011 A1* | 12/2012 | Sasai .................... H04N 19/176 375/240.12 |
| 2013/0016782 A1* | 1/2013 | Sasai .................... H04N 19/197 375/240.13 |
| 2013/0039422 A1* | 2/2013 | Kirchhoffer ........... H04N 19/52 375/240.13 |
| 2014/0307801 A1* | 10/2014 | Ikai ....................... H04N 19/91 375/240.18 |
| 2015/0003529 A1* | 1/2015 | Thirumalai .......... H04N 19/597 375/240.14 |
| 2015/0010087 A1 | 1/2015 | Funnell |
| 2015/0341655 A1* | 11/2015 | Joshi .................... H04N 19/70 375/240.16 |
| 2016/0227254 A1* | 8/2016 | Karczewicz ........... H04N 19/70 |
| 2016/0286235 A1* | 9/2016 | Yamamoto ............. H04N 19/70 |
| 2017/0164000 A1* | 6/2017 | Sasai ..................... H04N 19/52 |

OTHER PUBLICATIONS

Wiegand T. et al., "Overview of the H.264/AVC Video Coding Standard", IEEE Transactions on Circuits and Systems for Video Technology, vol. 13, No. 7, Jul. 1, 2003, p. 560-576.

* cited by examiner

METHOD, SYSTEM AND DEVICE FOR IMAGE AND VIDEO CODING

CROSS REFERENCE TO RELATED APPLICATIONS

This application claims priority to provisional application No. 62/167,727, filed May 28, 2015, entitled "Image and Video Coding", which is incorporated by reference herein for all purposes.

This application also claims priority to European application No. 16167220.9, filed April 27, 2016, which is incorporated by reference herein for all purposes.

FIELD

The present invention relates to a method, system and device for image and video coding.

BACKGROUND

Digital video compression finds wide application in a variety of devices including televisions, smartphones, personal computers, laptops, cameras and video conferencing. Where video compression is used, such devices implement video compression encoding and decoding as defined in standards such as HEVC (High Efficiency Video Coding) and H.264.

The standards set out that video frames are to be divided into rectangular picture regions known as blocks. Each video frame is divided into coding tree units (CTUs) which are processed in raster scan order. Each CTU is sub-divided into multiple sub-blocks and divided again as permitted by H.264 and HEVC.

In order to achieve good performance, the standards require that a decoder retains information from previously decoded blocks in the same frame. Typically, a decoder makes calculations or decisions based on values or attributes of neighbouring blocks that have already been decoded.

Video image data is commonly processed by spatially segmenting frames into tiles or slices which can be decoded independently of other slices or tiles.

Aspects and embodiments were conceived with the foregoing in mind.

SUMMARY

Methods, systems and devices in accordance with the aspects set out below may be used as part of the encoding or decoding of a video frame or a part of a video frame. Video frames may be segmented into a plurality of image blocks and processed according to the aspects set out below.

Viewed from a first aspect, there is provided a method of image processing, the method comprising:
dividing image data into a plurality of blocks of image data wherein each block is defined by a first positional index and a second positional index;
for each block of image data
processing the block of image data to generate at least one parameter value required to process one or more adjacent blocks of image data;
determining a position of a memory element in a parameter memory by combining the first positional index of the block of image data with the second positional index of the block of image data; and
storing the generated at least one parameter value in a memory element in the position by overwriting at least one parameter value generated from a previously processed block of image data which has been previously stored at the determined position in the parameter memory.

The step of dividing image data into a plurality of blocks of image data may comprise organising image data into a plurality of blocks wherein each block is defined by a first positional index and a second positional index.

Viewed from a second aspect, there is provided a system comprising a server, the server operative to:
receive a plurality of blocks of image data wherein each block is defined by a first positional index and a second positional index;
initialise a parameter memory comprising a plurality of memory elements;
the server further operative, for each block of image data, to:
process the block of image data to generate at least one parameter value required to process one or more adjacent blocks of image data; and
store the generated at least one parameter value in a memory element in the parameter memory by overwriting at least one parameter value generated from a previously processed block of image data.

Methods and systems in accordance with the first and second aspects enable at least one parameter value for an image section image section to be generated and stored in a position which is occupied by a previously generated parameter value. The previously generated parameter value may no longer be useful as it may no longer be needed in the processing of the image, i.e. it may be redundant.

The parameter memory may be a linearly addressable one dimensional memory space which may be, for example, a one-dimensional array. The one-dimensional array may be a contiguous one-dimensional array or a data-word as a data-word. The data word may be of any required length such as, for example, 32-bit, 64-bit, 128-bit and 256-bit.

A one-dimensional array means that each of the stored parameter values are stored in a single linear array with the position in that linear array determined by the first positional index and the second positional index.

The effect of storing the parameter values in a one-dimensional array is that all of the values are retained inside a simple, one-dimensional, memory structure which is computationally efficient to access.

The effect of storing the parameter values in a contiguous one-dimensional array is that each of the values are stored next to each other in memory which reduces the footprint of the image processing in memory.

The position of the memory element used to store the generated at least one parameter value may be calculated using a combination, e.g. a linear combination, of the first positional index and the second positional index of the current block.

The effect of this is that the position in memory, should the parameter value stored in that position in memory be required for further processing of the plurality of blocks of image data, is simple to calculate which reduces the amount of processing required to retrieve the parameter value stored in that position in memory The linear combination of the first positional index and the second positional index may be based on a calculation of the difference between the first positional index and the second positional index.

The parameter memory may comprise a memory element for each of a plurality of diagonal block positions in the plurality of blocks of image data.

The effect of this is that sufficient parameter memory is initialised before processing to avoid memory shortages during processing.

The at least one parameter value generated from the current block of image data may be stored to overwrite at least one parameter value generated from a previously processed block of image data at the same diagonal position as the current block.

BRIEF DESCRIPTION OF THE DRAWINGS

First and second embodiments in accordance with the first and second aspects will now be described by way of example only and with reference to the following drawings in which.

Features from the first and second embodiments may be combined.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1:
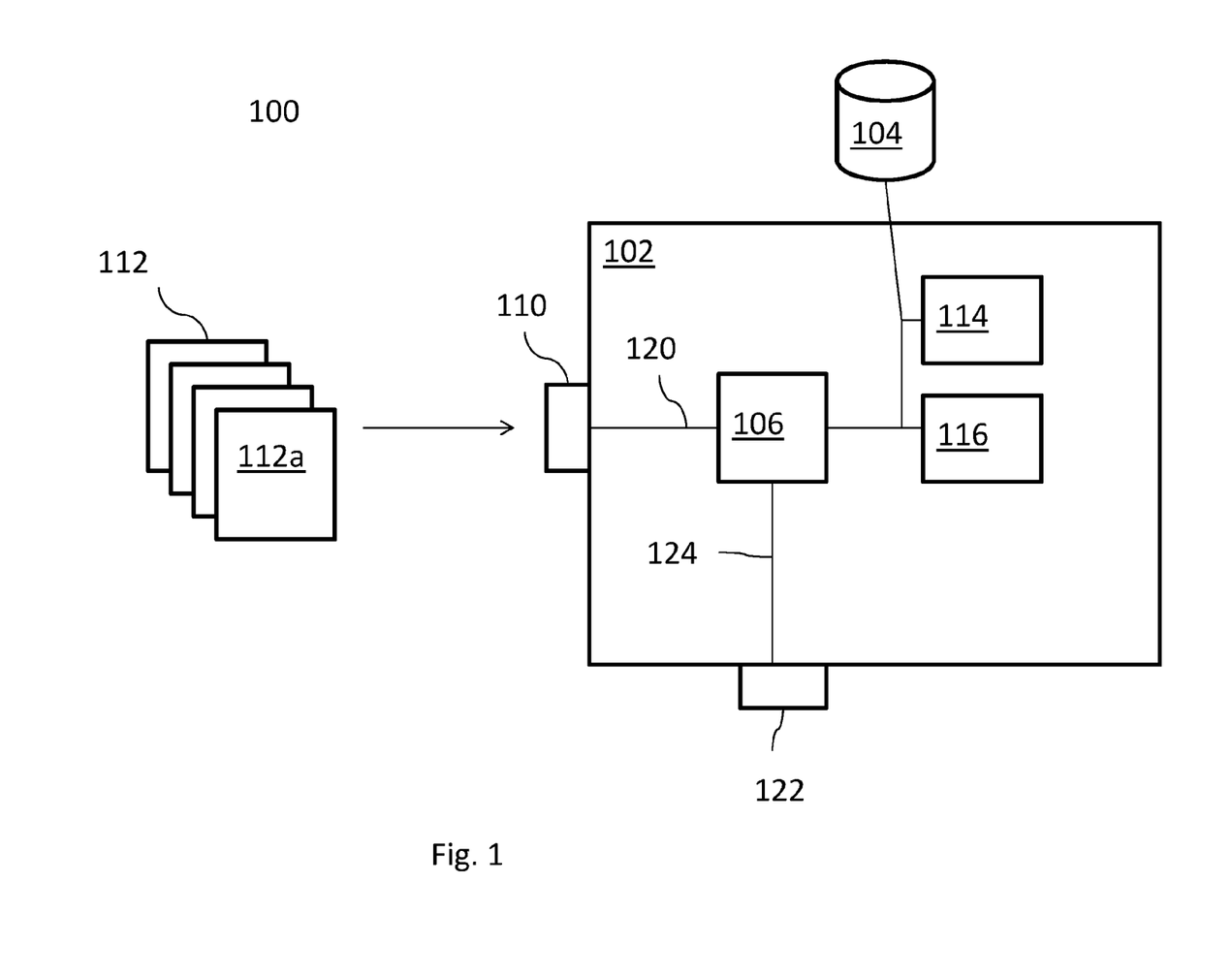
FIG. 1 schematically illustrates a system in accordance with the first embodiment.

We now describe system 100 with reference to FIG. 1 in accordance with the first embodiment.

System 100 comprises a server 102 and memory 104. The server 102 comprises a processor 106 which is operative to store data in the memory 104 and retrieve data from the memory 104 in order to process the data and other data.

Server 102 comprises an input interface 110 at which a sequence of encoded video frames 112 are received. Typically, the video frames have been encoded in accordance with the HEVC and H.264 standards.

The video frames 112 are transmitted using a standard data bus 120 to the processor 106 where they are processed. After the processor 106 has processed the video frames 112 and they are ready for display, they are transmitted to output interface 122 using standard data bus 124.

Server 102 further comprises an image segmentation module 114 and a decoder module 116.

Figure 2A:
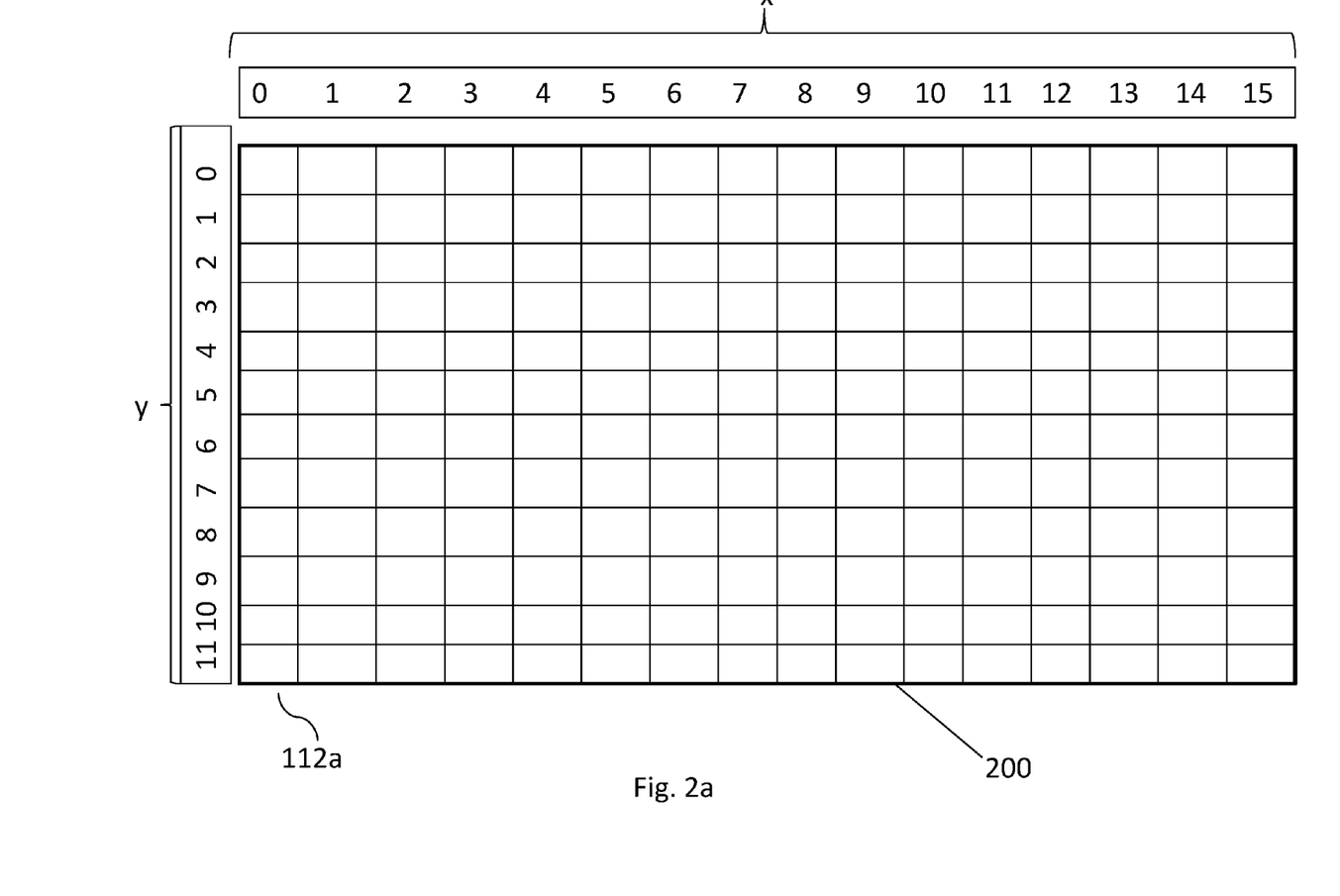
FIG. 2a schematically illustrates a segmented video frame in accordance with the first embodiment.
Figure 2B:
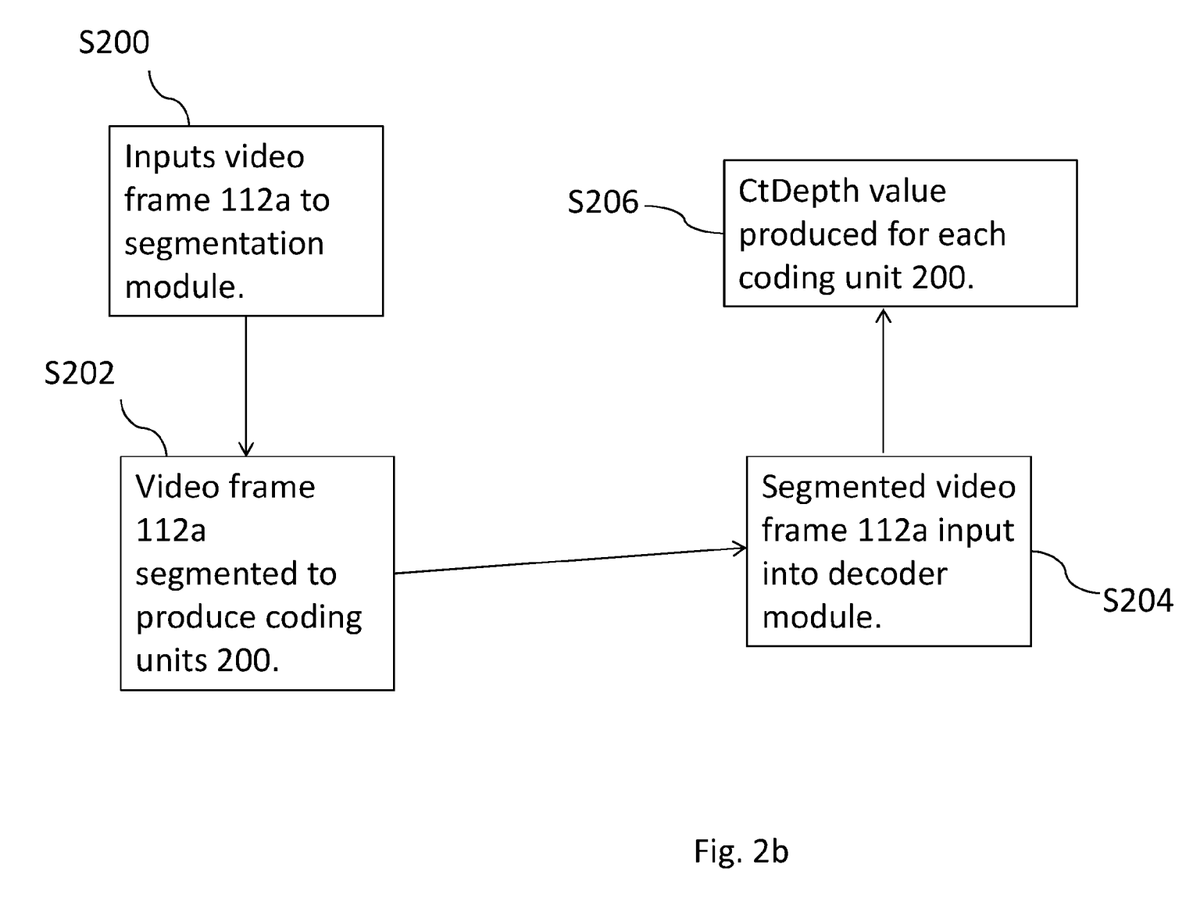
FIG. 2b illustrates the steps taken by the server when the video frame is received in accordance with the first embodiment.

We now describe how one video frame 112a in the sequence of video frames 112 is decoded with reference to FIGS. 2a and 2b.

Responsive to receiving the sequence of encoded video frames 112, server 102 calls segmentation module 114 in a step S200 and provides the first video frame 112a in the sequence of video frames 112 as an input to the segmentation module 114.

Segmentation module 114 then, in a step S202, segments the video frame 112a into a plurality of image sections 200 in accordance with the principal of coding quadtree subdivision set out in HEVC or H.264. An example of a segmented video frame 112a is illustrated in FIG. 2a. The position of each image section is indexed using a horizontal index (x) and a vertical index (y). The use of the horizontal index and the vertical index enables the segmentation module 114 to determine the position of the image section in the respective segmented video frame 112a.

The use of horizontal index and vertical index is intended only to aid the clarity of the description and is not intended to place any limitation on the orientation of the segmented video frame.

The segmented video frame 112a is then input into decoder module 116 in a step S204. The position of each image section is also provided to the decoder module 116 in order that the decoder module 116 can determine the respective position of image sections in the segmented video frame 112a. Image sections are processed in blocks of sixteen by the decoder module 116 to generate a parameter coding tree depth (CtDepth) value for each image section in a step S206. CtDepth is a value which is introduced in the HEVC standard but is merely an example of the range of parameters that are used in image processing. Other parameters that may be stored include prediction unit motion data, sample adaptive offset (SAO) parameters, coefficient flag data and intra-prediction data.

The order in which the decoder module 116 processes the blocks of sixteen image sections is a raster order. That is to say, the decoder module 116 processes the image sections defined by the positional indices x between 0 and 3 and y between 0 and 3 as a first group of sixteen image sections and then progresses in the raster order to the image sections defined by the positional indices x between 4 and 7 and y between 0 and 3 as a second group of sixteen image sections and so on.

Figure 3:
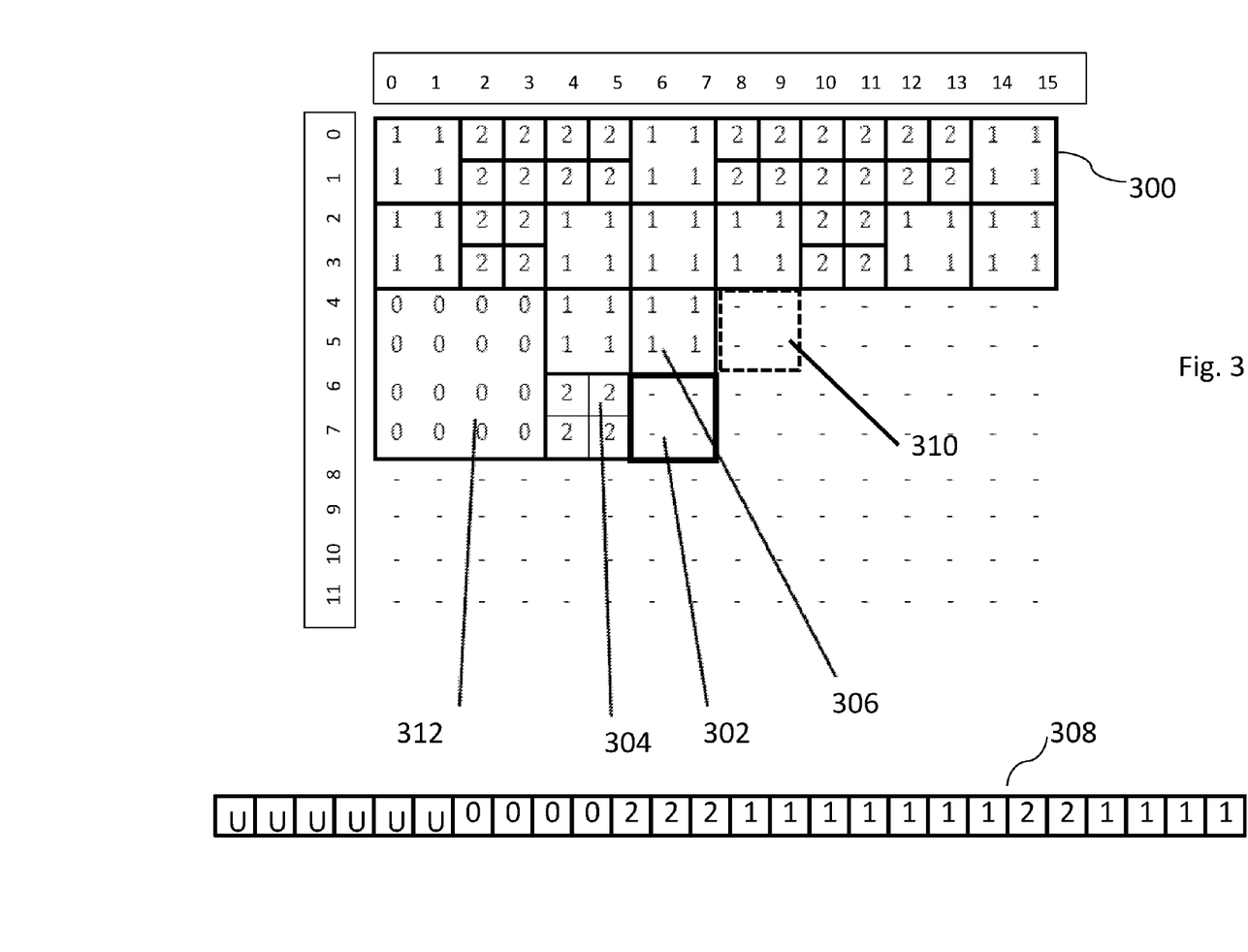
FIG. 3 schematically illustrates a segmented video frame and a superimposed two dimensional matrix of parameter values in accordance with the first embodiment.

For illustration only, FIG. 3 illustrates a partially populated matrix 300 of CtDepth values superimposed onto video frame 112a wherein each CtDepth value corresponds to the CtDepth value at the respective image section. In FIG. 3, the decoder module 116 has decoded the first row of blocks of the segmented video frame 112a, i.e. the image sections defined by x between 0 and 15 and y between 0 and 3, and is in the process of decoding the second row, i.e. the image sections defined by x between 0 and 15 and y between 4 and 7. Image section 302 is the next image section to be decoded using the decoder module 116.

One-dimensional array 308 comprises only CtDepth values for those image sections 200 adjacent to image sections for which a CtDepth value has not been generated. The left most values are populated with the letter U as they correspond to the left of the image sections at the left-most end of the segmented video frame 112a and are thus unknown. In applications where the segmented video frame 112a is part of a larger video frame, these values may be populated.

Figure 4:
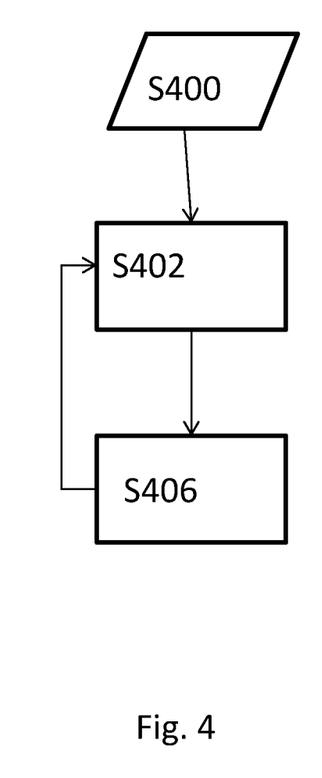
FIG. 4 schematically illustrates a system flowchart in accordance with the first embodiment.

We now describe, with reference to the illustrative system flowchart in FIG. 4, the allocation of memory when segmented video 112a is processed by decoder module 116.

The segmented video frame 112a is received in step S400. A one dimensional array 308 is instantiated in memory 104. Decoder module 116 then generates a CtDepth value for each of the image sections in the segmented video frame 112a. Starting at image section at horizontal index x=0 and at vertical index y=0, i.e. the first image section, the CtDepth value is generated for that image section in step S402.

The generated CtDepth value is then stored at a position in the array equal to the horizontal index minus the vertical index added to a memory offset. In the example of the segmented video frame 112a, the CtDepth value corresponding to the first image section would be stored in the one dimensional array 308 at position 0−0+13, i.e. position 13 in the one dimensional array.

The memory offset is given the value 13 in this example as it is equal to the maximum value of the vertical index (12, the point on the top left above the top of the segmented video frame 112a) minus the minimum possible value of the horizontal index (−1, the positions to the left of the segmented video frame 112a).

Steps S400 to 406 are then repeated until each the image sections 200 have been processed.

Where the first image section is being processed, it is clear that there will be no redundant values in the one dimensional array 308 and therefore, that no CtDepth values will be need to be deleted from the one dimensional array 308 as they can all be used in the further processing of the image sections 200 that make up the segmented video frame 112a.

The effect of the system 100 is perhaps yet more clearly explained with reference to block 302 in FIG. 3 where a matrix of CtDepth values 300 is depicted for illustration only. Block 302 contains the image sections at (in processing order) (x=6, y=6), (x=7, y=6), (x=6, y=7) and (x=7, y=7).

The one-dimensional array 308 at this point in the processing of segmented video frame 112a contains the CtDepth values corresponding to the image sections at (y=7, x between 0 and 5), (y=6, x=5), (y=5, x between 5 and 7), (y=4, x=7), y=3, x= between 7 and 15). These CtDepth values correspond to the image sections which are adjacent to image sections for which a CtDepth value is yet to be generated. The CtDepth values corresponding to all of the other image sections 200 have become redundant and are therefore not stored in one-dimensional array 308 as they have been previously overwritten in accordance with the steps set out below with reference to FIG. 4.

At this point, the CtDepth value of the image section 200 at (x=5, y=7) has just been calculated which means that the block of image sections 304 is now complete and each of the image sections have been given the value 2. Prior to processing the block of image sections 304, the decoder module 116 processes block 306 which have each been given the value 1. Block 312 has also been processed where each image section has been given the CtDepth value 0.

The decoder module 116 first generates a CtDepth value for the image section 200 at (x=6, y=6) in step S402. In order to generate the CtDepth value for the image section 200 at (x=6, y=6), the decoder module 116 may need to access the CtDepth values for the image sections at (x=5, y=6) and (x=6, y=5).

The position of those CtDepth values in the one dimensional array 308 can easily be determined using the formula x-y in addition to the memory offset (c) which is equal to 13. This gives a position in the one dimensional array 308 for the CtDepth value corresponding to the image section 200 at (x=5, y=6) of (5-6)+13, i.e. the position of the CtDepth value in the one dimensional array 308 corresponding to the image section 200 at (x=5, y=6) is 12. The decoder module 116, having calculated the position, can then access the 12th position in the one dimensional array 308 and retrieve the CtDepth value 2 from the one dimensional array 308.

Using the same linear formula, the position in the one dimensional array 308 for the CtDepth value corresponding to the image section at (x=6, y=5) is calculated as 14 which enables the decoder module 116 to access the 14th position in the one dimensional array 308 to retrieve the value 1 from the one dimensional array 308.

The retrieved CtDepth values can then be used in the generation of the CtDepth value for the image section 200 at (x=6, y=6) at step S402. The CtDepth value is generated to be 1. The CtDepth value for the image section 200 at (x=6, y=6) is then stored at position (6-6)+13, i.e. the 13th position, in the one-dimensional array 308 in step S406. In storing the CtDepth value for the image section 200 at (x=6, y=6), the CtDepth value which previously occupied position 13 in the one dimensional array 308 is overwritten. The CtDepth value which previously occupied that position The effect of this is that the CtDepth value stored during the processing of the image section 200 at (x=5, y=5), i.e. the CtDepth value which previously occupied position 13 in the one dimensional array 308, is overwritten. This reduces the memory requirement for processing of the segmented video frame 112a.

The decoder module 116 then moves to the image section 200 at (x=7, y=6) to generate a CtDepth value for that image section in step S402. The decoder module 116 then retrieves the CtDepth values corresponding to the image sections at (x=6, y=6) and (x=7, y=5) from one dimensional array 308. The CtDepth value corresponding to the image section 200 at (x=6, y=6) is retrieved from the 13th position in the one-dimensional array 308. The CtDepth value corresponding to the image section 200 at (x=7, y=5) is retrieved from position (7-5)+13, i.e. the 15th position in the one dimensional array 308.

The decoder module 116 will then use the CtDepth values from the 13th and 15th positions to generate a CtDepth value for the image section 200 at (x=7, y=6). The decoder module 116 generates a CtDepth value of 1.

The CtDepth value for the image section 200 at (x=7, y=6) is stored at the 14th position in the one-dimensional array 308 by overwriting the CtDepth value previously stored at the 14th position in the one dimensional array 308.

The decoder module 116 then moves to the image section 200 at (x=6, y=7) to generate a CtDepth value for that image section 200 in step S402. In order to generate a CtDepth value for the image section 200 at (x=6, y=7), the decoder module 116 requires the CtDepth values from the adjacent image sections which are the image sections at (x=5, y=7) and (x=6, y=6).

The decoder module 116 then retrieves the CtDepth value for the image section at (x=5, y=7) from the 11th position in the one-dimensional array 308 and retrieves the CtDepth value for the image section at (x=6, y=6) from the 13th position in the one-dimensional array 308. The decoder module 116 uses the retrieved CtDepth values to generate a CtDepth value of 1 for the image section at (x=6, y=7).

The CtDepth value for the image section 200 at (x=6, y=7) is stored at the 12th position in the one-dimensional array 308 by overwriting the CtDepth value previously stored at the 12th position in the one dimensional array 308 and moves to S408. That is to say, the value previously stored at the 12th position in the one dimensional array 308, which would be the CtDepth value corresponding to the image section at (x=5, y=6) is overwritten.

The decoder module 116 then moves to the image section at (x=7, y=7) to generate a CtDepth value for that image section in step S402. The decoder module 116 retrieves CtDepth values corresponding to adjacent image sections at (x=6, y=7) and (x=7, y=6) from the respective 12th and 14th positions in the one-dimensional array 308 and uses them to generate a CtDepth value of 1 for the image section at (x=7, y=7).

The CtDepth value for the image section at (x=7, y=7) is then stored in the one dimensional array 308 at the 13th position by overwriting the CtDepth parameter stored for the image section at (x=6, y=6). That is to say, the previous diagonal value has become redundant in the processing of the video frame 112a and the CtDepth value is no longer needed and so is not stored in one dimensional array 308.

In summary, after processing the image sections in the group of image sections: (x=6, y=6), (x=7, y=6), (x=6, y=7) and (x=7, y=7), the non-redundant values, i.e. those values which may be useful in processing further image sections, are stored at locations in the one dimensional array 308 between 12 and 14 or more generally at locations between x1-y2+c and x2-y1+c where x1 is the smallest value of x in the group of image sections, x2 is the largest value of x in the group of image sections, y1 is the smallest value of y in the group of image sections, y2 is the largest value of y in the group of image sections and c is the memory offset, i.e. 13, set out above. The effect of this is that it is straightforward and quick to access the location of the CtDepth parameters in the block of image sections 302 as only the values of x1, x2, y1, y2 and c need to be known in order to calculate the range of locations in the one dimensional array 308 where the CtDepth values are being stored.

Figure 5:
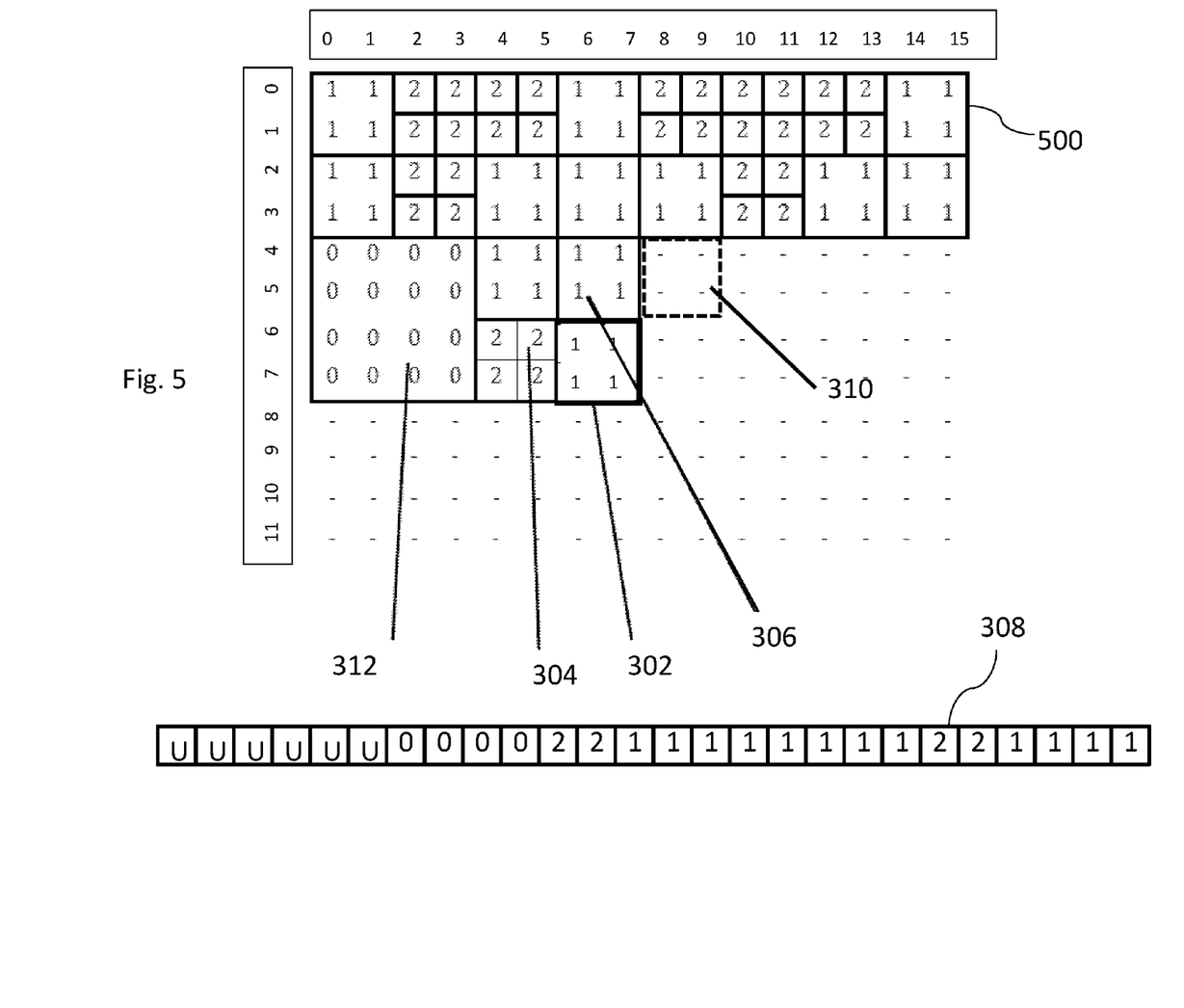
FIG. 5 schematically illustrates a segmented video frame and an updated superimposed two dimensional matrix of parameter values in accordance with the first embodiment.

FIG. 5 illustrates an updated matrix of CtDepth values 500 and an updated one-dimensional array 308. The image sections populated with a hyphen in the matrix 500 are image sections for which a CtDepth value is yet to be generated.

After CtDepth values have been generated for block 302, the decoder module 116 moves to block 310 where steps S402 to S406 are repeated for each image section in block 310.

After every image section 200 has been processed, the one-dimensional array 308 should contain values corresponding to the bottom and right edges of the video frame and the video frame 112a should be processed and ready for output back to processor 106 which is the operative to output the video frame 112a through output interface 122.

In a second embodiment, a memory structure may be used to store more than one value from the processing of segmented video frame 112a. An example of such a memory structure is a data-word of a given length. In this example we discuss the use of a 32-bit data word to store the image processing parameters cu_skip_flag, pcm_flag, CtDepth and CuPredMode which are generated for every image section 200.

Consider again the segmented image frame described in reference to FIG. 2. We illustrate the storage of parameters cu_skip_flag, pcm_flag, CtDepth and CuPredMode for each of these image sections using FIG. 6. Each of cu_skip_flag, pcm_flag, CtDepth and CuPredMode are defined in HEVC and H.264.

Figure 6:
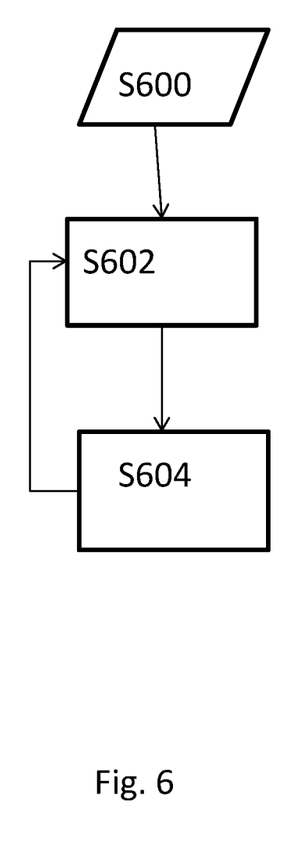
FIG. 6 schematically illustrates a system flowchart in accordance with the second embodiment.

The segmented video frame 112a is received by the decoder module 116 in a step S600. The decoder module 116 then generates the parameters cu_skip_flag, pcm_flag, CtDepth and CuPredMode for the image section at (x=0, y=0) in step S602.

The decoder module 116 writes the generated cu_skip_flag, pcm_flag, CtDepth and CuPredMode values to a memory location in memory 104 in step S604.

Figure 7:
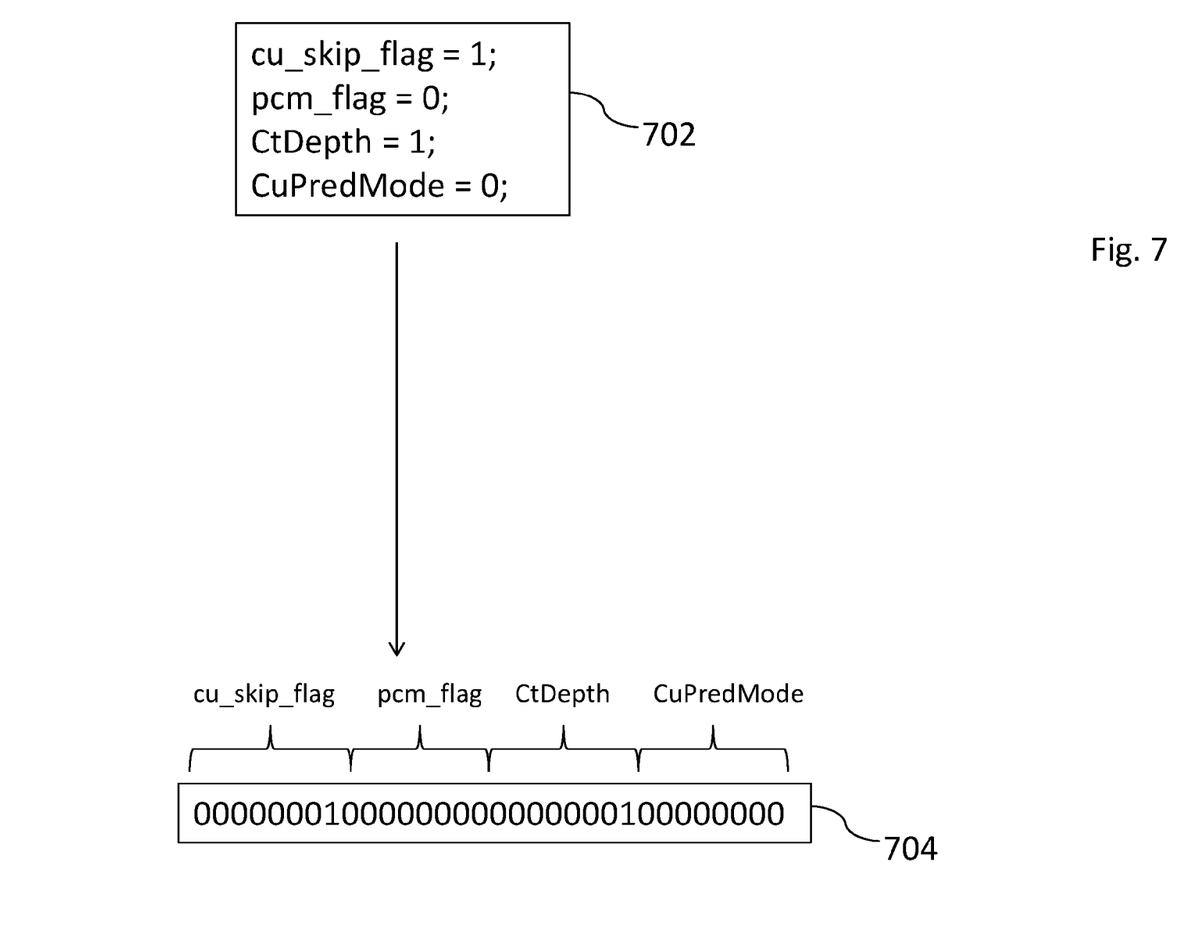
FIG. 7 schematically illustrates the storage of parameter values using a data-word in accordance with the second embodiment.

The location is defined by the equation 4*(x−y+c) (c is again the memory offset) which identifies the location in memory of a 32-bit data word 704 where each of cu_skip_flag, pcm_flag, CtDepth and CuPredMode are stored sequentially as bytes in the 32-bit data word 704. This is illustrated in FIG. 7 where the array of values for cu_skip_flag, pcm_flag, CtDepth and CuPredMode are illustratively mapped from an array 702 to the 32-bit data word 704. The array 702 is for illustration only and to provide clarity to this description. There is no need for the values of cu_skip_flag, pcm_flag, CtDepth and CuPredMode to be stored in an array 702 prior to being written to a 32-bit data word 704

As can be seen from FIG. 7, the value of cu_skip_flag for the image section at (x=0, y=0) is 1 which, when converted into binary for storage in the 32-bit data word 704, is 00000001, the value of pcm_flag for the image section at (x=0, y=0) is 0 which, when converted into binary for storage in the 32-bit data word 704, is 00000000, the value for CtDepth for the image section at (x=0, y=0) is 1 which, when converted into binary for storage in the 32-bit data word 704, is 00000001 and the value for CuPredMode for the image section at (x=0, y=0) is 0 which, when converted into binary for storage in the 32-bit data word 704, is 00000000. These values, i.e. the binary representations of cu_skip_flag, pcm_flag, CtDepth and CuPredMode, are stored sequentially as a 32-bit data word 704 at location 4*(x−y+c) in memory 104. That is to say, the binary representations of cu_skip_flag, pcm_flag, CtDepth and CuPredMode are stored as a 32-bit data word at location 4*(0−0+13), i.e. location 52 in memory 104. If the binary representation of cu_skip_flag, pcm_flag, CtDepth and CuPredMode corresponding to another image section previously occupied location 52 then those values would be overwritten.

The effect of this is that the location of the values of cu_skip_flag, pcm_flag, CtDepth and CuPredMode for the image section at (x=0, y=0) is simple and computationally efficient to compute which reduces the time it takes to access the correct location in memory when the values of cu_skip_flag, pcm_flag, CtDepth and CuPredMode for the image section at (x=0, y=0) are required for the processing of the image sections at (x=1, y=0) and (x=0, y=1), say.

Steps S600 to S604 are then repeated for each of the image sections in the segmented video frame 112a.

In executing steps S400 to S406 or steps S600 to S604, the decoder module 116 may also instantiate a two-dimensional array in memory 104 which is populated with parameters that may be generated during the processing of each image section but which it is difficult to predict when they will become useful, such as, for example, the IntraPrediction-Mode parameter defined in the HEVC standard. Such a two-dimensional array may be useful for the processing of the video frames which follow the segmented video frame 112a or in deblocking of the processed video frames or debugging of the decoder module 116.

In another embodiment, decoder module 116 may also address memory availability issues.

Prior to a segmented video frame being received by the decoder module 116 in step S600 it is not possible to make any accurate predictions as to how much memory will be required for the processing of the segmented video frame and it is not possible to know, a priori, how many of the 32-data words will be necessary for the processing of the segmented video frame. It is therefore important to ensure that sufficient memory is being provided during the processing of the segmented video frame 112a without needing to evaluate memory availability every time decoder module 116 moves from one image section to the next.

Decoder module 116, responsive to receiving the segmented video frame 112a, may initialise a number of 32-bit data words in memory 104 equal to the number of image sections. This mitigates against the possibility of memory being unavailable for the processing of image blocks in the segmented video frame 112a.

An example of the benefit of initialising memory is now illustrated with reference to the formula:

$$ctxInc=(condL\&\&availableL)+(condA\&\&availableA)$$
$$\text{where } condL=CtDepthL>cqtDepth \text{ and}$$
$$condA=CtDepthA>cqtDepth$$

This formula is detailed in HEVC for calculating ctxInc for the split_cu_flag parameter and is executed for each image section. The values CtDepthA and CtDepthL are the respective values of CtDepth for the image sections above and to the left of the current image section. The values availableA and availableL represent the availability of CtDepth values of neighbouring image sections respectively above and to the left of the current image section. The values availableA and availableL are defined as 1 when the neighbouring image section is within the same block of image sections as the current image section and 0 when the current image section is within a different block of image sections to the current image section and is thus unavailable. That is to say, the availability of the neighbouring image sections needs to be checked at every iteration using this formula. Initialising the memory 104 in the manner described above alleviates the need to check the availability of neighbouring image sections. The effect of this is that the required number of memory availability checks is reduced.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. Method of image processing, the method comprising:
   dividing image data into a plurality of blocks of image data wherein each block is defined by a first positional index and a second positional index;
   for each block of image data
   processing the block of image data to generate at least one parameter value required to process one or more adjacent blocks of image data;
   determining a position of a memory element in a parameter memory by combining the first positional index of the block of image data with the second positional index of the block of image data
   and
   storing the generated at least one parameter value in a memory element in the position by overwriting at least one parameter value generated from a previously processed block of image data which has been previously stored at the determined position in the parameter memory.

2. Method according to claim 1 wherein the combination of the first positional index and the second positional index is based on a linear combination of the first positional index and the second positional index.

3. Method according to claim 2 wherein the linear combination of the first positional index and the second positional index is based on a calculation of the difference between the first positional index and the second positional index.

4. Method according to claim 1 further comprising initialising a parameter memory.

5. Method according to claim 4 wherein the generation of at least one parameter value is responsive to the initialisation of the parameter memory.

6. Method according to claim 5 wherein the parameter memory comprises a memory element for each of a plurality of diagonal block positions in the plurality of blocks of image data.

7. Method according to claim 6 wherein the at least one parameter value generated from the current block of image data is stored to overwrite at least one parameter value generated from a previously processed block of image data at the same diagonal position as the current block.

8. Method according to claim 1 where in the number of memory elements in the initialised parameter memory comprises a memory element for each of the diagonal block positions in the plurality of blocks of image data.

9. Computer program instructions for implementing the method of claim 1.

10. System comprising a server, the server operative to:
    receive a plurality of blocks of image data wherein each block is defined by a first positional index and a second positional index;
    initialise a parameter memory comprising a plurality of memory elements;
    the server further operative, for each block of image data, to:
    process the block of image data to generate at least one parameter value required to process one or more adjacent blocks of image data; and
    store the generated at least one parameter value in a memory element in the parameter memory by overwriting at least one parameter value generated from a previously processed block of image data.

11. System according to claim 10, wherein the position of the memory element used to store the generated at least one parameter value is calculated using a combination of the first positional index and the second positional index of the current block.

12. System according to claim 11, wherein the combination of the first positional index and the second positional index is based on a linear combination of the first positional index and the second positional index.

13. System according to claim 10, wherein the parameter memory comprises a memory element for each of a plurality of diagonal block positions in the plurality of blocks of image data.

14. System according to claim 13, wherein the at least one parameter value generated from the current block of image data is stored to overwrite at least one parameter value generated from a previously processed block of image data at the same diagonal position as the current block.

15. System according to claim 10, where in the number of memory elements in the initialised parameter memory comprises a memory element for each of the diagonal block positions in the plurality of blocks of image data.

16. Computer program instructions for adapting a device to implement the system of claim 10.

* * * * *